United States Patent [19]

Fukuyama et al.

[11] Patent Number: 5,090,552
[45] Date of Patent: Feb. 25, 1992

[54] THREE DIMENSIONAL SORTING APPARATUS

[75] Inventors: Kiyoshi Fukuyama, Moriyama; Toru Wada, Shiga; Kozo Kitabata, Moriguchi; Masahiro Sudare, Higashi-Osaka; Shigemi Tsuchitani, Toyono; Kazuya Ohminami, Himeji, all of Japan

[73] Assignee: Tsubakimoto Chain Co., Osaka, Japan

[21] Appl. No.: 654,484

[22] Filed: Feb. 12, 1991

[30] Foreign Application Priority Data

Feb. 14, 1990 [JP] Japan ..................... 2-31372

[51] Int. Cl.$^5$ ............................. B65G 47/46
[52] U.S. Cl. .................... 198/365; 198/370; 198/372; 209/657
[58] Field of Search ........... 198/365, 370, 372, 477.1, 198/435; 104/130; 209/657, 656

[56] References Cited

U.S. PATENT DOCUMENTS

| | | | |
|---|---|---|---|
| 4,781,281 | 11/1988 | Canziani | 198/365 |
| 4,884,676 | 12/1989 | Suizu | 198/365 |
| 4,938,149 | 7/1990 | Lötzer | 104/130 X |
| 4,993,535 | 2/1991 | Scata | 198/365 |

FOREIGN PATENT DOCUMENTS 0252519 12/1985 Japan ..................... 198/365

*Primary Examiner*—D. Glenn Dayoan
*Attorney, Agent, or Firm*—Howson & Howson

[57] ABSTRACT

A three dimensional sorting apparatus utilizes a plurality of frame members, supported for circulating movement in a closed path. A tray is mounted for up and down movement on each of the frame members and is guided along rails which determine its height. Changeover rails, controlled to move up and down, are provided to connect a first guide rail extending past an intake station to a selected one of a plurality of secondary guide rails extending at different levels past a plurality of discharge stations. This enables an article to be discharged into a selected one of several discharge ports at a selected discharge station. Discharge is carried out by pivoting the tray forward upon release of a tray-retaining latch by a discharge assisting device at each discharge station. Alternatively, the article is carried on a conveyor driven by a pinion which is activated by a discharge assisting rack at each discharge station.

12 Claims, 5 Drawing Sheets

THREE DIMENSIONAL SORTING APPARATUS

BRIEF SUMMARY OF THE INVENTION

This invention relates to sorting, and in particular to a sorting apparatus for taking in articles or other materials at an intake port and distributing the articles selectively to different discharge ports.

Sorting equipment of the type to which this invention relates finds utility in many applications, including manufacturing plants, warehouses, etc.

Prior sorters fall generally into two categories. One type of sorting apparatus which is employed frequently is the two-dimensional sorter in which a large number of sorting conveyors branch out from an intake conveyor toward different discharge ports. All of the sorting conveyors are disposed in the same plane. Another type of sorting apparatus is the rotary rack sorter, which employs a large number of multi-level racks circulating in a horizontal path along rails. Articles at the different levels on a rack are selectively discharged at specified discharge stations along the path of travel of the rack.

The two-dimensional sorter requires a large floor area, and the floor area required depends on the number of article destinations. Furthermore, with a given two-dimensional sorter, it is difficult to provide additional destinations.

With the rotary rack sorter, it is possible to provide for additional article destinations by providing additional levels on the racks. Therefore, no additional floor area is required. However, the rotary rack sorter has the drawback that, when an article is taken in, it must be placed in a selected rack level corresponding to the desired destination. Thus, selection is required at the intake station of the apparatus. Because of the requirement for selection of rack levels at the intake stage, complicated measures must be taken to insure proper timing at the intake station in order to avoid errors.

The general object of the invention is to provide a sorting apparatus which avoids the foregoing problems of the prior art.

A more specific object of the invention is to provide a simple and reliable sorting apparatus which has the ability to route articles toward a large number of selectable destinations, and which does not require an excessively large floor area.

It is also an object of the invention to provide a simple and reliable sorting apparatus in which additional destinations can be easily provided without increasing floor area requirements.

The invention addresses the foregoing problems by taking in all articles at the same level at an intake station, and discharging each article at a selected one of several available discharge levels at a selected one of several discharge stations More particularly, the sorting apparatus in accordance with the invention comprises a plurality of frame members; rail means arranged to support the frame members for circulating movement in a closed path; tray means carried by each frame member; means on each frame member for guiding the tray means carried thereby for up and down movement relative to the frame member; a first guide rail extending along a first part of the closed path and having an exit end; a plurality of secondary guide rails extending around a second part of the closed path at different levels, each secondary guide rail having an intake end; an array of change-over rails situated between the exit end of the first guide rail and the intake ends of the secondary guide rails, with the change-over rails being arranged to move vertically to connect the exit end of the first guide rail selectively to the intake end of any one of said secondary guide rails; controllable means for effecting vertical movement of the change-over rails; and follower means connected to each of the tray means, and guidable by the guide rails and the change-over rails to control the level of the tray means as they travel along the closed path. As the follower of each tray means reaches the change-over rails after being guided by the first guide rail along the first part of the closed path, it is selectively moved to any one of a plurality of different levels for travel along the second part of the closed path. Thus the discharge level is selected by operation of the change-over rails. Discharge of a tray-carried article at the discharge level is carried out by discharge assisting means at a selected one of several discharge stations.

Each of the trays has a unique number assigned to it. When an article is taken in on one of the trays a number representing the specified destination of the article is associated with the tray number in a computer. This is accomplished by entering the information manually on a keyboard, or by means of a bar code reader, voice recognition equipment, or other suitable means. As the tray moves along the first guide rail, and before it reaches the change-over rails, the computer instructs the change-over rails to connect the exit end of the first guide rail to the intake end of the secondary guide rail which will guide the tray to the specified destination port. The tray is transferred from the first guide rail to the selected secondary guide rail by way of one of the change-over rails. It is then transported along the selected secondary guide rail until it reaches the designated destination port, where the article on the tray is discharged by discharge assisting means under control of the computer.

Further objects, details and advantages of the invention will be apparent from the following detailed description when read in conjunction with the drawings.

DETAILED DESCRIPTION

Figure 7:
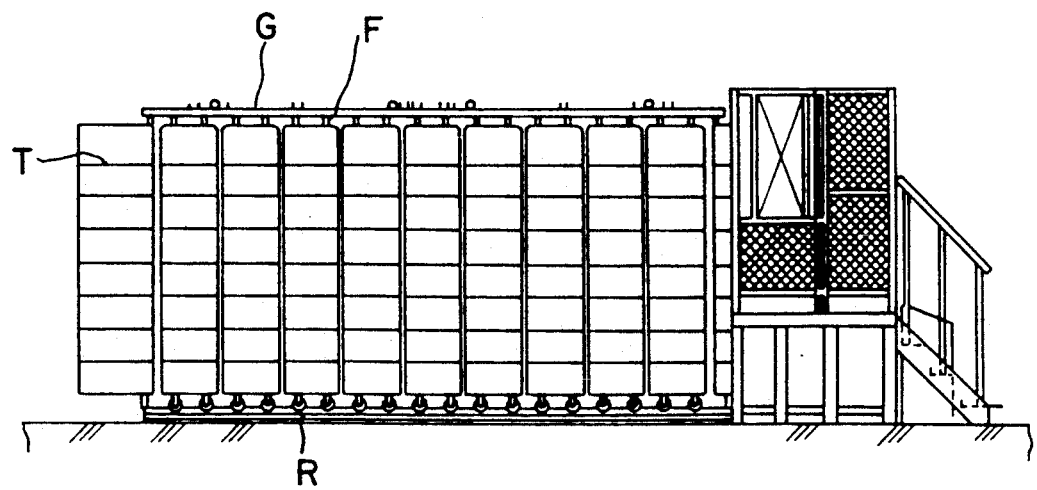
FIG. 7 is a front elevational view of a conventional rotary rack sorter.

Referring briefly to FIG. 7, the conventional rotary rack sorter comprises a large number of rack frames F which are supported between an upper annular rail G and a lower annular rail R for circulating movement in a closed path. Each rack has a number of levels T. Typically, each of the discharge stations along the path of the rack frames has multiple discharge ports, so that articles discharged from different levels at a discharge station may go to different destinations. Thus, when an article is to be taken in on a rack frame, it will ordinarily be necessary to place it at a particular selected level T. With the invention, however, all articles are taken in at the same level.

Figure 1:
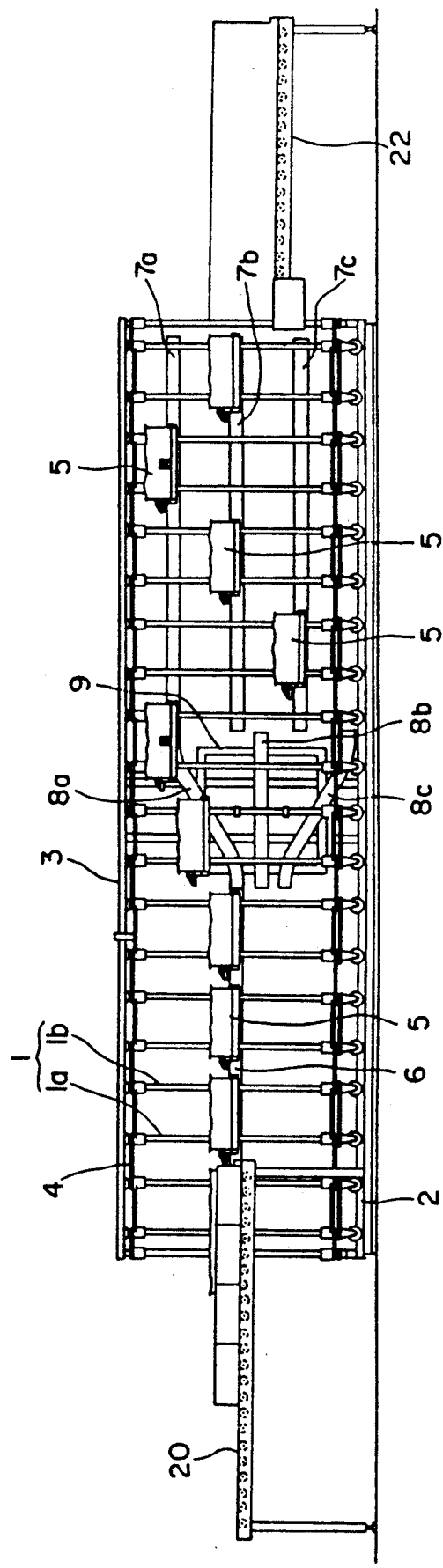
FIG. 1 is a front elevation of a sorting apparatus in accordance with the invention.
Figure 2:
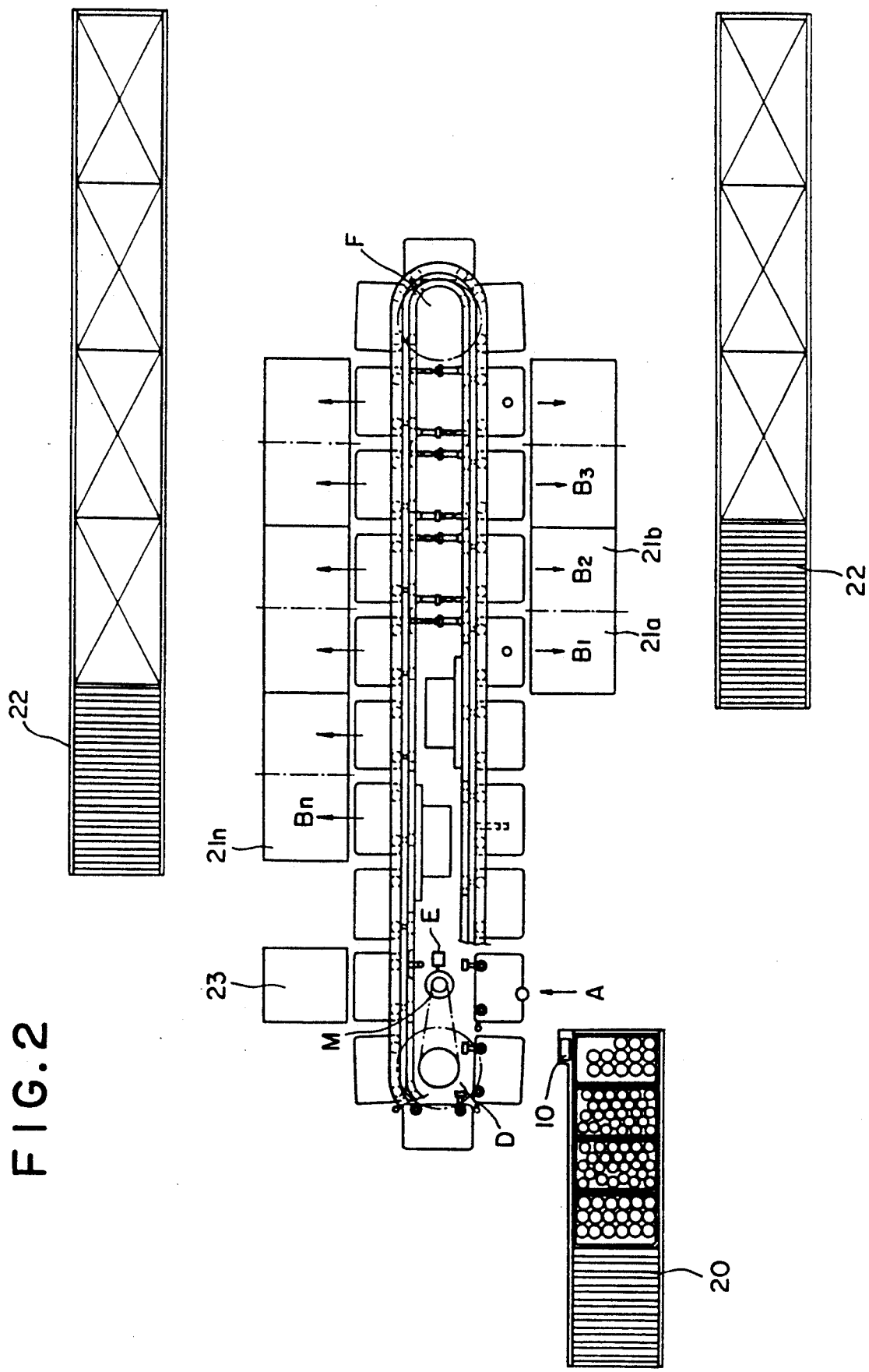
FIG. 2 is a top plan view of the same.
Figure 3:
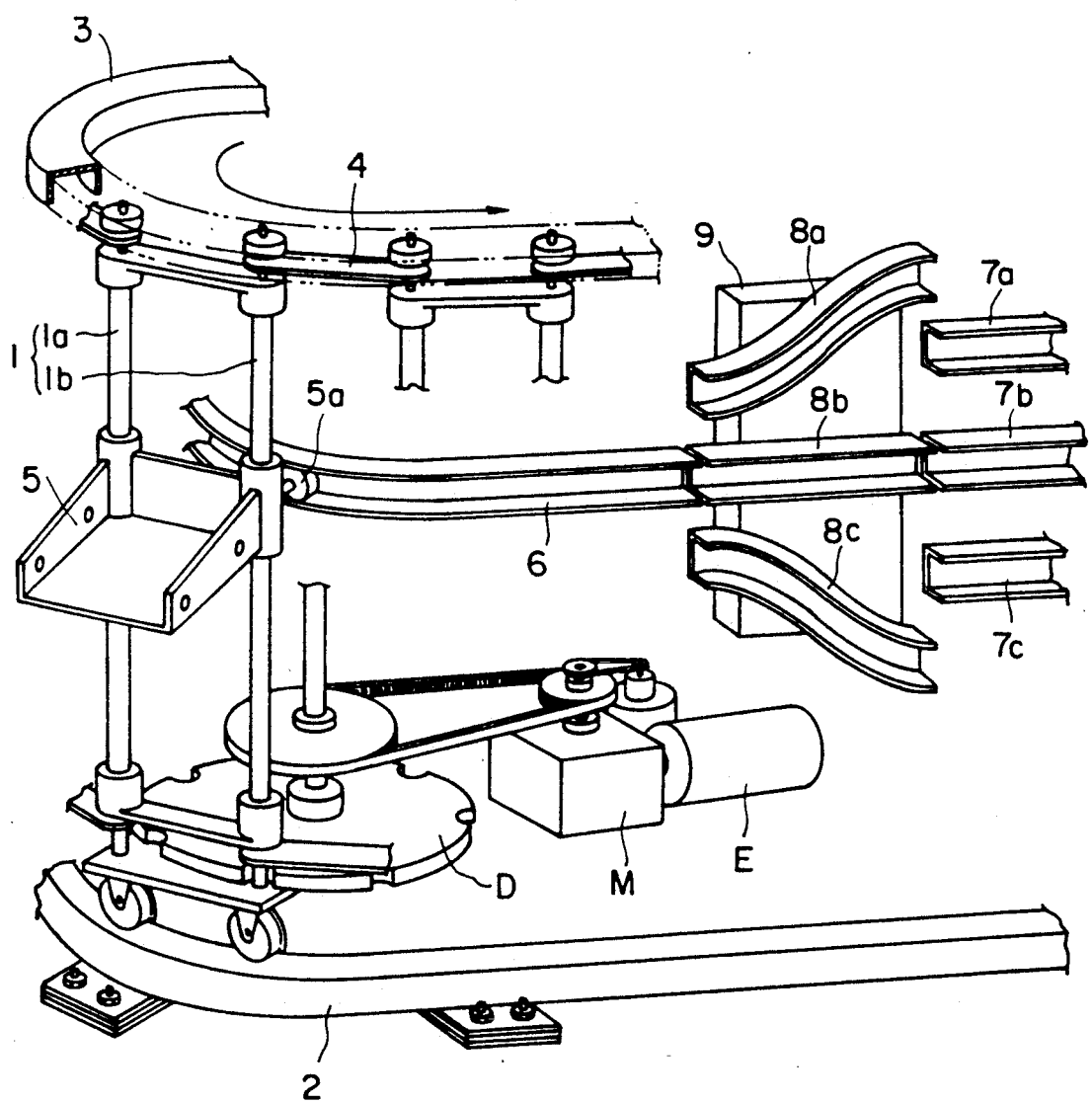
FIG. 3 is a fragmentary perspective view illustrating the essential parts of the invention.

Referring to FIGS. 1, 2 and 3, the sorting apparatus comprises a large number of transporting frames arranged to circulate in an elongated, closed path. A typical frame 1 comprises two upright guide posts la and lb. The frame has wheels which travel on a lower rail 2 and guide wheels which are guided by an upper rail 3. Adjacent frames are connected together by links 4.

As shown in FIGS. 2 and 3, a driving sprocket D at one end of the apparatus meshes with the upright guide posts of the individual frames, and is driven by motor M to effect movement of the frames along rails 2 and 3. An idler F guides the frames as they move around the opposite end of the apparatus.

As shown in FIGS. 1 and 3, a tray supporting member 5 is provided on each frame and mounted for up and down sliding movement on the upright guide posts of the frame. Each tray supporting member is provided with a rearwardly projecting wheel 5a, as seen in FIG. 3, for following the guide rails. In FIG. 3, wheel 5a is shown following a first guide rail 6, which serves to maintain the tray support at a predetermined level as it passes a take-in station.

The first guide rail 6 extends along a first part of the closed path of the circulating frames, and secondary guide rails 7a, 7b and 7c extend, at separate levels, along a second part of the closed path. Change-over rails 8a, 8b and 8c are situated between the exit end of guide rail 6 and intake ends of secondary guide rails 7a, 7b and 7c. As best shown in FIG. 3, these change-over rails are mounted on a lifting frame 9, which is movable up and down for connection of rail 6 to any selected one of rails 7a, 7b and 7c. Thus, with the change-over rails in the condition shown in FIG. 3, rail 6 is connected by change-over rail 8b to intermediate secondary rail 7b. If frame 9 is moved downward, rail 6 can be connected to upper secondary rail 7a. If frame 9 is moved upward, rail 6 can be connected to lower secondary rail 7c. As the frame moves past the change-over rails, the guide wheel 5a of its tray support is guided by one of rails 8a, 8b and 8c onto one of rails 7a, 7b and 7c respectively. The level of the tray support is controlled accordingly.

In the operation of the apparatus described thus far, a unique number associated with each transporting frame is associated in a control computer (not shown) with frame position information generated by an encoder E associated with motor M and drive sprocket D (FIGS. 2 and 3). Destination information is entered into the computer as each article is placed on a tray at an intake station along guide rail 6, preferably by means of a bar code reader. The destination information includes not only the location of the exit station along the path of travel of the transporting frames, but also the level of the destination port. The latter information determines which of the secondary guide rails is selected.

Accordingly, by way of example, when the destination of an article is on the upper level at a particular discharge station, the upper level and the location of the discharge station are both identified to the computer when the article is placed on a tray at the intake station. When the tray supporting member carrying that article approaches the change-over rails, the computer directs the change-over control to lower frame (if it is not already lowered) so that rail 6 is connected by change-over rail 8a to secondary rail 7a. Consequently, the article is carried toward its designated discharge station at the upper level corresponding to guide rail 7a.

When the tray supporting member reaches the selected discharge station, it is opposite the discharge port associated with upper rail 7a at that station. The control computer then causes a discharge assisting device to discharge the carried article through the discharge port.

Figure 4:
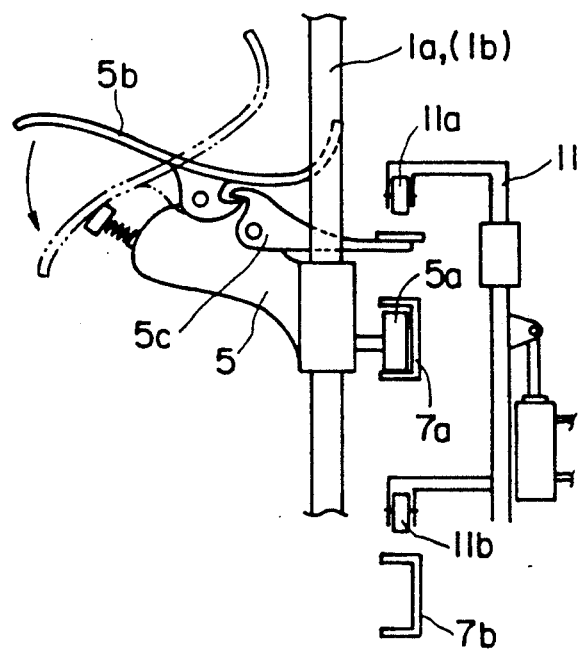
FIG. 4 is a fragmentary elevational view illustrating a first embodiment of a discharge assisting means in accordance with the invention.

In FIG. 4, which shows one form of discharge assisting device, a tray 5b is mounted pivotally on a tray supporting member 5. This tray is normally urged by its own weight, or by the weight of a carried article, to tilt forward in a load discharging direction. The follower wheel 5a of the tray support member 5 is guided in upper secondary rail 7a. The tray is normally prevented from pivotal motion in the discharging direction by a latching lever 5c, which is also pivotally mounted on tray support member 5 and engaged with a hook on the underside of the tray. Rod 11 is movable in the vertical direction by an actuator which operates in response to an operating instruction from the controlling computer. Rod 11 is located opposite a discharge station, and has a roller 11a arranged to tilt latching lever 5c so that it disengages the hook, allowing the tray to tilt forward to the position indicated by the broken lines, and discharge its contents through a discharge port.

Rod 11 also has roller 11b, which is adapted to engage latching lever 5c if the follower wheel is guided in intermediate secondary rail 7b. A similar roller (not shown) is provided on rod 11 to unlatch a tray guided along the lower secondary rail.

Figure 5:
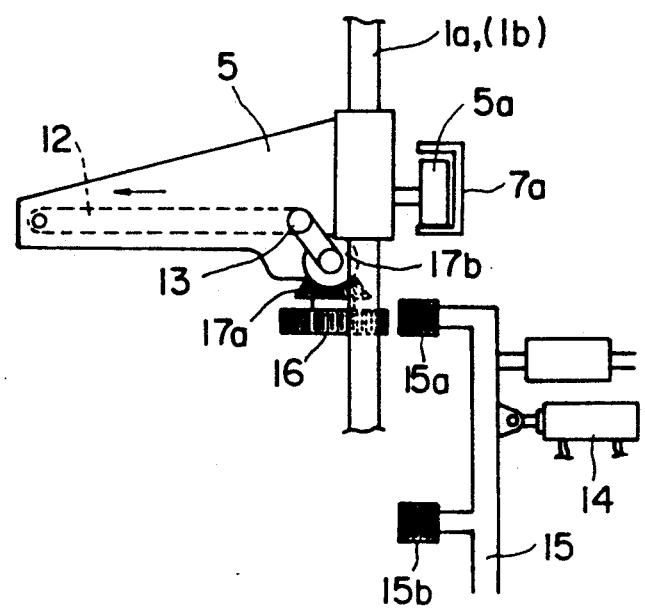
FIG. 5 is a fragmentary elevational view illustrating a second embodiment of a discharge assisting means in accordance with the invention.

In FIG. 5, which shows another form of discharge assisting device, an article discharge conveyor 12 is mounted on tray support member 5. A rod 15, located opposite a discharge station, is movable back and forth horizontally by an actuator 14 in response to a instructions issued by the control computer. The rod carries a toothed rack 15a, which is engageable with a pinion 16 arranged to drive discharge conveyor 12 through a drive shaft 13 by way of bevel gears 17a and 17b. When the tray support 5 approaches a discharge port opposite secondary guide rail 7a, rack 15a may be advanced by actuator 14 to mesh with pinion 16. This causes the article-supporting face of discharge conveyor 12 to move forward, in the direction indicated by the arrow, to discharge the carried article.

FIG. 5 also shows a second rack 15b on rod 15, for effecting discharge of articles from a discharge conveyor travelling at the intermediate level. A similar third rack (not shown) is provided for discharging articles from a conveyor travelling at the lower level.

Figure 6:
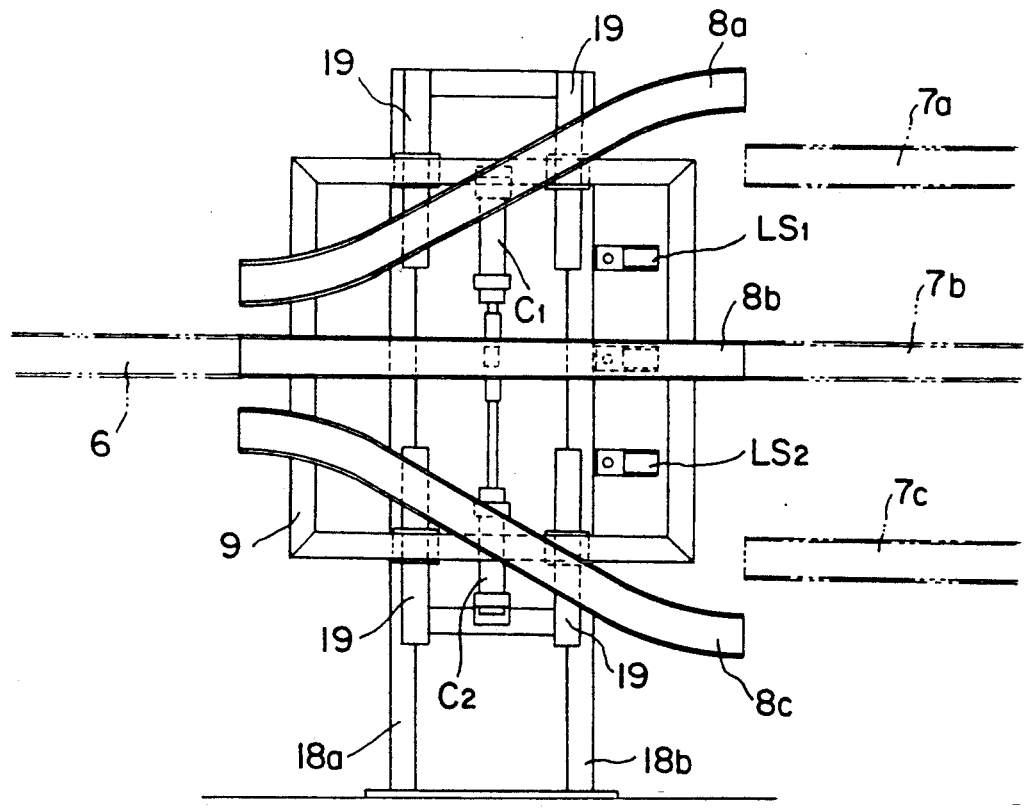
FIG. 6 is a fragmentary front elevation illustrating details of the change-over rail operating mechanism.

As shown in FIG. 6, the change-over rails 8a, 8b and 8c are fixed relative to one another on frame 9. Frame 9 is provided with slides 19 which cooperate with fixed upright posts 18a and 18b. These slides are movable up and down by actuators C1 and C2 operating in response to instructions from the controlling computer. Limit switches, including switches LS1 and LS2 are provided to insure proper registration of the change-over rails with guide rails 6, 7a, 7b and 7c.

Referring again to FIG. 2, articles to be sorted are carried in on conveyor 20 and moved past a bar code reader 10 as they are placed on trays at intake station A. If a destination of an article is read by the bar code reader, the destination of the tray on which the article has been placed is automatically specified. When that tray approaches the change-over rails, the controlling computer issues an instruction causing frame 9 to move, if necessary, causing the change-over rails to connect guide rail 6 to the secondary rail 7a, 7b or 7c which extends past the discharge port corresponding to the specified destination. Consequently, the tray advances along the specified secondary rail, and approaches a specified discharge station of stations $B_1$, $B_2$, $B_3$, ...$B_n$. The discharge assisting device (lifting rod 11 in FIG. 4 or rack carrying rod 15 in FIG. 5) is operated to discharge the article into one of boxes $21a$, $21b$, ...$21_n$, which will ultimately be carried out on conveyor 22. Ordinarily, but not necessarily in all cases, there will be multiple levels of article-receiving boxes at each discharge station.

After passing the last discharge station $B_n$, the tray support 5 is returned to rail 6 by suitable guide rail sections (not shown), or a set of change-over rails similar to change over rails 8a, 8b and 8c. After return to rail 6, the tray support is ready to take on another article.

After leaving the last discharge station $B_n$, but before reaching intake station A, a discharging operation is performed at the location of box 23 to insure that the trays arriving at intake station A are empty. This supplementary discharging operation is carried out by a discharge assisting mechanism such as that shown in FIGS. 4 or 5. Accordingly, even if an article should remain on a tray passing discharge station $B_n$ due to an error in the sorting and discharging operations, it will be discharged into box 23. In the case of the tilting tray of FIG. 4, if necessary, cam means (not shown) may be provided, at a position between the supplementary discharge station and intake station A, to reset the tray to its latched position.

It will be apparent from the foregoing that the sorting apparatus of the invention is capable of distributing materials a large number of destinations, and yet does not occupy a large amount of floor space.

Since the change-over rail mechanism operates in response to an instruction from a controlling computer in accordance with a unique number corresponding to each tray, it is unnecessary, when loading an article onto the sorting apparatus, to select a particular tray for carrying an article to its designated destination, as is the case with a conventional rotary rack sorter. Furthermore, an article remains on its own tray during change-over from rail 6 to rails 7a, 7b and 7c. Accordingly, the possibility of error is substantially eliminated, and control of the apparatus is greatly simplified. In addition, since the articles remain on their own trays, articles of many different shapes can be sorted precisely and smoothly.

The apparatus as described herein can be modified in a number of respects. For example, while three secondary rails are shown, it is possible to realize many of the advantages of the invention in sorters having two, or four or more secondary rails. Other forms of discharge assisting devices, such as pushers, can be substituted for the latch and rack mechanisms shown in FIGS. 4 and 5. Numerous other modifications may be made to the apparatus described without departing from the scope of the invention as defined in the following claims.

We claim:

1. A three dimensional sorting apparatus wherein a plurality of frame members, supported for circulating movement by means of annular rails, are connected to each other by means of links; a tray supporting member is mounted for up and down movement on each of said frame members; and change-over rails, controlled to move up and down, are provided at a position between a first guide rail for guiding and holding said tray supporting members at a first level and a plurality of secondary guide rails for guiding and holding the tray supporting members at different levels.

2. A three dimensional sorting apparatus according to claim 1 wherein a tray is mounted for tilting load discharging movement on each of said tray supporting members, and an engaging lever for engaging with and holding said tray in an article receiving posture is mounted on each of said tray supporting members, said lever being operative to release said tray for load discharging movement.

3. A three dimensional sorting apparatus according to claim 1 wherein an article discharging conveyor is mounted on each of said tray supporting members, each article discharging conveyor having a drive pinion connected thereto for operating the conveyor when engaged and rotated by a drive rack.

4. A three dimensional sorting apparatus comprising: a plurality of frame members; rail means arranged to support said frame members for circulating movement in a closed path; tray means carried by each frame member; means on each frame member for guiding the tray means carried thereby for up and down movement relative to the frame member; a first guide rail extending along a first part of said closed path and having an exit end; a plurality of secondary guide rails extending around a second part of said closed path at different levels, each secondary guide rail having an intake end; an array of change-over rails situated between the exit end of said first guide rail and the intake ends of said secondary guide rails, said change-over rails being arranged to move vertically to connect said exit end of the first guide rail selectively to the intake end of any one of said secondary guide rails; controllable means for effecting vertical movement of said change-over rails; and follower means connected to each of said tray means, and guidable by said guide rails and said change-over rails to control the level of the tray means as they travel along said closed path; whereby each tray, as its follower means reaches said change-over rails after being guided by said first guide rail along said first part of the closed path, can be selectively moved to any one of a plurality of different levels for travel along said second part of said closed path.

5. A three dimensional sorting apparatus according to claim 4 including driving means for moving said frame members in said closed path.

6. A three dimensional sorting apparatus according to claim 4 including link means connecting said frame members in series whereby said frame members move together in said closed path.

7. A three dimensional sorting apparatus according to claim 4 having a plurality of separate discharge stations along said second part of the closed path; a plurality of separate, vertically separated, discharge ports at each of said discharge stations, there being one discharge port at each discharge station for each of said plurality of different levels; and discharge assisting means, at each of said discharge stations, selectively operable to effect discharge of material carried by said trays, so that, when a tray is at a discharge station at any one of said plurality of different levels, the same operation of said discharge assisting means at said station effects discharge of the material carried by said tray into the discharge port for said one of said plurality of different levels.

8. A three dimensional sorting apparatus according to claim 4 including means on each of said frame members for tiltably supporting the tray mean thereon whereby the tray means can tilt from a material supporting position to a material discharging position, and discharge assisting means at each of a plurality of stations along said second part of the closed path, said discharge assisting means being selectively operable to effect tilting movement of said tray means to the material discharge position.

9. A three dimensional sorting apparatus according to claim 4 including means on each of said frame members for tiltably supporting the tray means thereon whereby the tray means can tilt from a material supporting position to a material discharging position, releasable latch means on each of said frame members for holding the tray means thereon in its material supporting position, and discharge assisting means at each of a plurality of stations along said second part of the closed path, said discharge assisting means being selectively operable to effect release of said latch means.

10. A three dimensional sorting apparatus according to claim 4 including conveyor means on each of said tray means for carrying and discharging material carried by said tray means, and discharge assisting means at each of a plurality of stations along said second part of the closed path, said discharge assisting means being selectively operable to effect discharging operation of said conveyor means.

11. A three dimensional sorting apparatus according to claim 4 including conveyor means on each of said tray means for carrying and discharging material carried by said tray means, pinion means connected to each said conveyor means and rotatable to effect discharging operation of said conveyor means, and discharge assisting means at each of a plurality of stations along said second part of the closed path, said discharge assisting means including rack means selectively operable to engage and rotate said pinion means to effect discharging operation of said conveyor means.

12. A three dimensional sorting apparatus according to claim 4 in which said array of change-over rails comprises a vertically movable supporting frame and a plurality of rails supported on said supporting frame in fixed relationship to one another and movable vertically with said supporting frame to provide a connection from the exit end of the first guide rail to any selected one of the intake ends of the secondary guide rails.

* * * * *